United States Patent
Jia et al.

(10) Patent No.: US 8,495,178 B1
(45) Date of Patent: Jul. 23, 2013

(54) DYNAMIC BANDWIDTH DISCOVERY AND ALLOCATION TO IMPROVE PERFORMANCE FOR BACKING UP DATA

(75) Inventors: Yingsong Jia, Beijing (CN); Xin Wang, Beijing (CN); Jian Wang, Beijing (CN)

(73) Assignee: Symantec Corporation, Mountain View, CA (US)

( * ) Notice: Subject to any disclaimer, the term of this patent is extended or adjusted under 35 U.S.C. 154(b) by 187 days.

(21) Appl. No.: 13/078,422

(22) Filed: Apr. 1, 2011

(51) Int. Cl.
*G06F 15/16* (2006.01)

(52) U.S. Cl.
USPC ............................ 709/219; 370/235; 709/226

(58) Field of Classification Search
USPC .................................. 709/226, 219; 370/235
See application file for complete search history.

(56) References Cited

U.S. PATENT DOCUMENTS

| | | |
|---|---|---|
| 5,668,810 A | 9/1997 | Cannella, Jr. |
| 5,727,159 A | 3/1998 | Kikinis |
| 5,848,070 A | 12/1998 | Durvaux et al. |
| 5,848,352 A | 12/1998 | Dougherty et al. |
| 5,987,518 A | 11/1999 | Gotwald |
| 6,192,082 B1 | 2/2001 | Moriarty et al. |
| 6,263,437 B1 | 5/2002 | Lincke et al. |
| 6,659,860 B1 | 12/2003 | Yamamoto et al. |
| 7,787,370 B1 * | 8/2010 | Aweya et al. ............... 370/230 |
| 2003/0115447 A1 | 6/2003 | Pham et al. |
| 2004/0153642 A1 | 8/2004 | Plotkin et al. |
| 2008/0104135 A1 * | 5/2008 | Kawamura et al. .......... 707/201 |
| 2009/0125726 A1 | 5/2009 | Iyer et al. |
| 2010/0274772 A1 * | 10/2010 | Samuels ..................... 707/693 |
| 2012/0195195 A1 * | 8/2012 | Rai et al. ..................... 370/235 |

FOREIGN PATENT DOCUMENTS

| | | |
|---|---|---|
| WO | WO 00/24192 | 4/2000 |
| WO | WO 01/06784 | 1/2001 |
| WO | WO 2007/118829 | 10/2007 |

OTHER PUBLICATIONS

"Analysis of the Statistical Cipher Feedback Mode of Block Ciphers"; Heys, Howard M.; IEEE Transactions on Computers; vol. 52, No. 1, Jan. 2003; pp. 77-92.

* cited by examiner

*Primary Examiner* — Anh-Vu Ly
*Assistant Examiner* — Hashim Bhatti
(74) *Attorney, Agent, or Firm* — Rory D. Rankin; Meyertons, Hood, Kivlin, Kowert & Goetzel, P.C.

(57) ABSTRACT

A system and method for efficient transfer of backup data over multiple networks. A backup server and a client computer are coupled to one another via a network, such as a local area network (LAN). The backup server is coupled to at least one storage server via another network, such as the Internet. This storage server is coupled to another storage server via at least two networks, such as the Internet and a Fiber Channel connection. The at least two networks are discovered and initialized by the two storage servers. Two or more networks may be bonded together in a single logical communication channel for transferring backup data. In one embodiment, the backup data corresponds to a duplication operation. When two or more network channels are included in the logical communication channel, a load balancing scheme is used to assign backup data traffic to appropriate network channels.

20 Claims, 6 Drawing Sheets

DYNAMIC BANDWIDTH DISCOVERY AND ALLOCATION TO IMPROVE PERFORMANCE FOR BACKING UP DATA

BACKGROUND OF THE INVENTION

1. Field of the Invention

This invention relates to the field of computer networks and, more particularly, to efficient transfer of backup data over multiple networks.

2. Description of the Related Art

As computer memory storage and data bandwidth increase, so does the amount and complexity of data that businesses daily manage. A large portion of the data may include electronic documents, announcements, tasks, discussion topics, and so forth. Depending on the business value of this information, access to certain information may be secure and private. The contents of information servers and end-user systems may be backed up to a backup storage to prevent loss of data, especially for data identified as crucial data. In such a case, a dedicated server and storage subsystem may include a backup system.

Administering and supporting an information technology (IT) infrastructure on a large number of end-user systems presents a significant challenge. An IT administrator may develop a management system for data backup and data protection; data recovery, restore, and restart; archiving and long-term retention; and day-to-day processes and procedures necessary to manage a storage architecture. This management system includes strategies and policies for administering storage systems on computing devices. For example, a backup image may be automatically migrated from one storage tier to another. This migration may be referred to as duplication of the backup image. Each storage tier may include a backup server coupled to storage devices such as hard disks.

The transfer of data from the backup server to the storage devices may be through a Fibre Channel (FC) link. A FC network protocol is generally implemented when a business accesses a large amount of information for booting over SANs, mail servers, file servers and large databases. In addition, server virtualization is increasingly used. Hypervisors are able to provide guest operating systems with virtualized storage, accessible through a Fibre Channel network infrastructure. An Ethernet protocol may be used to transfer information over global distances, to remote sites, or in clustered, low-latency compute environments. For example, the migration of a backup image from one backup server to a second backup server may utilize an Ethernet network.

In a given compute environment, particular network resources may be more efficient for data transfer than other network resources. However, connectivity, supported data rates of respective ports and packet sizes for applications each may affect the efficiency of network resources over time. Additionally, a given application, such as a backup application, may not support multiple network resources. Therefore, the data transfer for a backup or a duplication operation may be unable to utilize available and more efficient network resources.

In view of the above, improved systems and methods for efficient transfer of backup data over multiple networks are desired.

SUMMARY OF THE INVENTION

Systems and methods for efficient transfer of backup data over multiple networks.

In one embodiment, a computing system comprises a backup server and a client computer coupled to one another via a network, such as a local area network (LAN). The backup server is coupled to at least one storage server via another network, such as the Internet. This storage server is coupled to another storage server via at least two networks, such as the Internet and a Fibre Channel connection. The at least two networks are discovered and initialized by the storage servers. Two or more networks may be bonded together in a single logical communication channel for transferring backup data. In one embodiment, the backup data corresponds to a duplication operation. Selection to be in the logical communication channel may be dependent on several factors, such as data packet size and available bandwidth of respective network ports. When two or more network channels are included in the logical communication channel, a load-balancing scheme is used to assign backup data traffic to appropriate network channels.

These and other embodiments will be appreciated upon reference to the following description and accompanying drawings.

Figure 1:
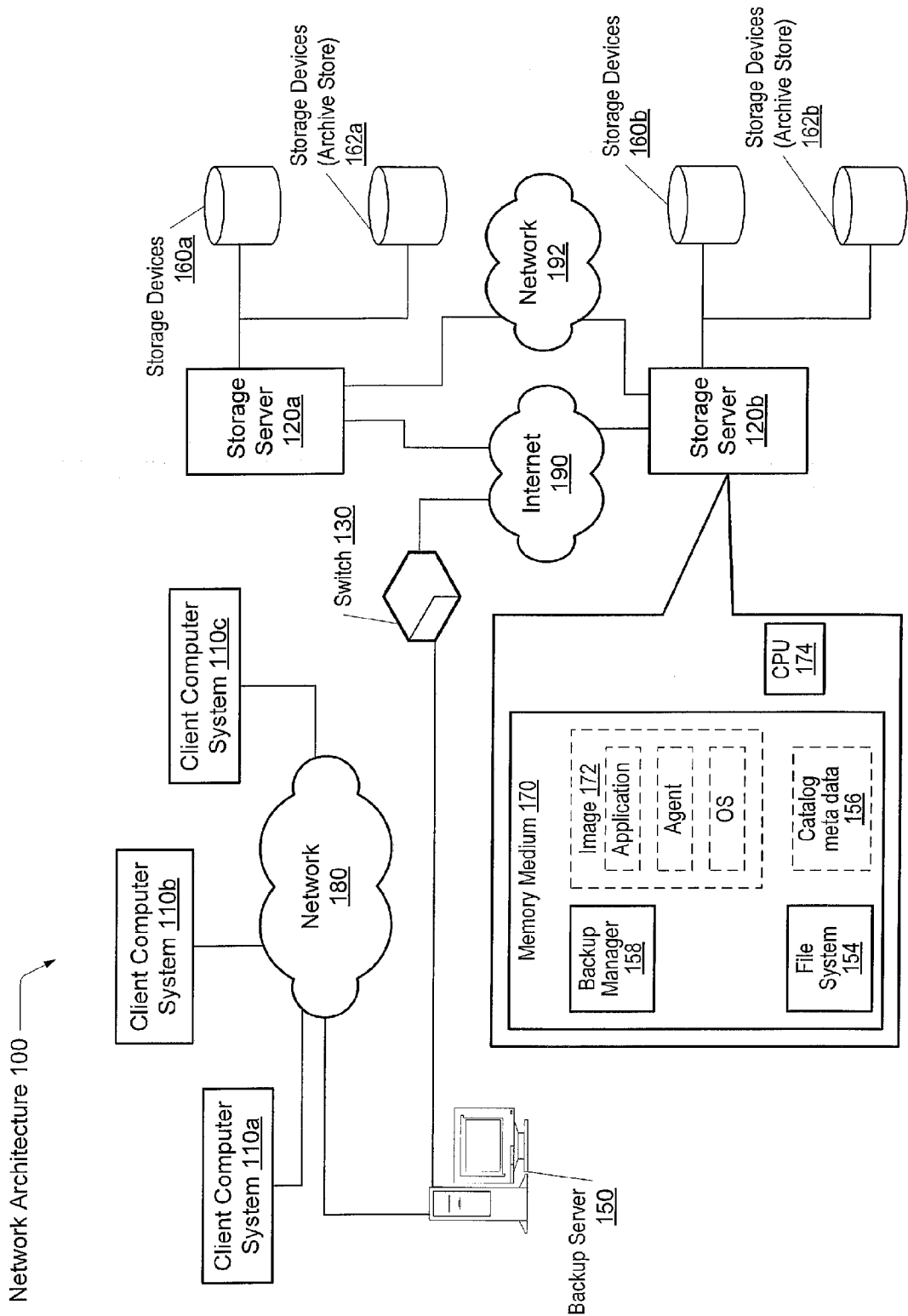
FIG. 1 is a generalized block diagram illustrating one embodiment of a network architecture.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, signals, computer program instruction, and techniques have not been shown in detail to avoid obscuring the present invention.

Various embodiments of systems and methods for efficient transfer of backup data over multiple networks are described herein. Generally speaking, two storage servers may be used in a duplication operation. A first storage server referred to as an initiator, or initiating, server may execute a backup software application. According to a given schedule, the backup software application may direct the initiator server to transfer a backup data image on a first storage medium to a target server. The first storage medium may be coupled to the initiator server. The target server may store the received backup data image on a second storage medium coupled to the target server. The transfer of the backup data image from the initiator server to the target server may utilize one or more networks. These networks may have been detected and initialized by each of the initiator and the target servers. A load-balancing scheme may be used to determine what portion of the entire backup data image to assign to each network for transferring data. A further description is provided later.

Referring to FIG. 1, a generalized block diagram illustrating one embodiment of a network architecture 100 including a capability for efficiently transferring backup data over multiple networks is shown. As shown, the network architecture 100 includes client computing systems 110a-110c interconnected through a local area network 180 to one another and to a backup server 150. Network 180 may include a variety of techniques including wireless connection, direct local area network (LAN) connections, wide area network (WAN) connections such as the Internet, a router, and others. Network 180 may comprise one or more LANs that may also be wireless. Network 180 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, Infiniband and so forth may be used in network 180.

Client computer systems 110a-110c are representative of any number of stationary or mobile computers such as desktop personal computers (PCs), servers, server farms, workstations, laptops, handheld computers, servers, personal digital assistants (PDAs), smart phones, and so forth. Generally speaking, client computer systems 110a-110c include one or more processors comprising one or more processor cores. Each processor core includes circuitry for executing instructions according to a predefined general-purpose instruction set. For example, the x86 instruction set architecture may be selected. Alternatively, the Alpha®, PowerPC®, SPARC®, or any other general-purpose instruction set architecture may be selected. The processor cores may access cache memory subsystems for data and computer program instructions. The cache subsystems may be coupled to a memory hierarchy comprising random access memory (RAM) and a storage device.

Each processor core and memory hierarchy within a client computer system may be connected to a network interface. In addition to hardware components, each of the client computer systems 110a-110c may include a base operating system (OS) stored within the memory hierarchy. The base OS may be representative of any of a variety of operating systems, such as, for example, MS-DOS®, MS-WINDOWS®, OS/2®, UNIX®, Linux®, Solaris®, AIX®, DART, or otherwise. As such, the base OS may be operable to provide various services to the end-user and provide a software framework operable to support the execution of various programs. Additionally, each of the client computer systems 110a-110c may include a hypervisor used to support virtual machines (VMs). As is well known to those skilled in the art, virtualization may be used in desktops and servers to fully or partially decouple software, such as an OS, from a system's hardware.

The backup server 150 may be coupled to a second network 190 through a switch 130. The network 190 may be the Internet, another outside network, or otherwise. Alternatively, network 180 may be coupled to network 190 via one or more switches. Switch 130 may utilize a protocol associated with both networks 180 and 190. The network 180 and the backup server 150 may interface with a set of communications protocols used for the Internet such as the Transmission Control Protocol (TCP) and the Internet Protocol (IP), or TCP/IP. Switch 130 may be a TCP/IP switch.

Storage devices 160a-160b may be used to store copies of data within the network architecture 100. Storage devices 160a-160b may include or be further coupled to several varieties of storage consisting of one or more hard disks, tape drives, server blades, Solid-State Disks (SSDs), or specialized devices, and may include a variety of memory devices such as RAM, Flash RAM, MEMS (Micro Electro Mechanical Systems) storage, battery-backed RAM, and/or non-volatile RAM (NVRAM), etc. Storage devices 162a-162b may be used to store copies of data stored on devices 160a-160b. Storage devices 162a-162b may comprise one or more of the memory devices listed for storage devices 160a-160b.

In one embodiment, the storage servers 120a-120b in network architecture 100 may create a copy of files on client computing systems 110a-110c to protect data. In addition, a backup agent on client computing systems 110a-110b and/or backup server 150 may determine when data objects qualify to be archived. The servers 120a-120b may be accessed via the Internet network 190. In addition, the storage servers 120a-120b may be accessed via at least one other network, such as network 192. Similar to network 180, protocols such as Fibre Channel, Fibre Channel over Ethernet (FCoE), iSCSI, and so forth may be used in network 190.

In one embodiment, a load-balancing scheme may be utilized to determine what portion of selected data to assign to each of networks 190 and 192 for transferring data between storage server 120a and storage server 120b. For example, in one embodiment, packet size may determine the network to use for data transfer. Fibre Channel networks typically achieve more efficient data transfer for large packet sizes than Internet networks. Therefore, relatively small data blocks, such as 64 kilobytes (KB) may be transferred over the Internet network 190. Larger data blocks that have a size greater than 64 KB may be transferred over a Fibre Channel network, such as network 192.

In another embodiment, a software layer comprising drivers within the backup application 158 may detect the capabilities of network ports in a corresponding one of the storage servers 120a-120b. In one example, this software layer may detect a Fibre Channel host bus adapter (HBA) card with 2×4-gigabyte (GB) ports. Additionally, the software layer may detect an Ethernet network card with 2×1-gigabyte ports. Therefore, the software layer may allocate 20% of the backup data traffic to the Ethernet ports and 80% of the backup data traffic to the Fibre Channel ports. In yet another embodiment, the allocation of backup data network traffic may be readjusted when a disconnection of a port is detected, when a connection of a new port is detected, and when a given port is measured to have a level of idleness above a first threshold or below a second threshold. For example, a busy port connection may be reallocated to have less of the backup data network traffic. A relatively idle port connection may be reallocated to have more of the backup data network traffic.

A web service is typically an application programming interface (API) or Web API that is accessed via Hypertext Transfer Protocol (HTTP) and may be executed by storage servers 120a-120b and backup server 150. A web service supports interoperable machine-to-machine interaction over a network. It has an interface described in a machine-process format, such as Web Services Description Language (WSDL). Storage servers 120a-120b, backup server 150 and other machines and servers not shown may communicate with each other over application programming interfaces such as web services.

The backup server 150 and the storage servers 120a-120b may include a backup application 158. As shown for storage server 120b, this backup application 158, or "backup manager" may comprise program instructions stored on the memory 170 and executable by the processor 174 to perform one or more backup operations. Backup operations may include creating partial or full backups, e.g., on a computer system or from one computer system to another system; performing restore functions (e.g., partial or granular restore functions, or full restore functions) on a computer system or from one computer system to another computer system; backup operations may also include other operations, such as duplication operations. Policies for backup and duplication operations within a lifecycle may be determined for data images. For example, the policies may include determining a number of tiers in a tiered storage, a type and a number of storage media, a time duration for an image to be stored on a given storage medium, the hours of the day to block from particular operations, and so forth.

A backup system agent may assist the backup manager 158. The backup manager 158 may be configured to create a volume image backup. In some embodiments, the backup manager 158 may receive user input directing the backup manager 158 to create a volume image backup of a specific system. In some embodiments, the backup manager 158 may create a volume image backup of a specific system automatically, e.g., the backup manager may be scheduled to perform regular backups of a specific system. As part of creating backups, the backup manager 158 may also create catalog metadata 156 associated with the backup data.

The catalog metadata 156 created by the backup manager 158 during a backup operation may include at least one or more of the following: a data name, data size, a fingerprint of the data, a batch number, as well as data type, version number, ownership, permissions, modification time, backup segment and sub-segment identifiers, cryptography segment and sub-segment identifiers, error code, etc. A batch number may be used to identify the particular backup operation in which an associated backup entry was created. Other forms of metadata and/or identifiers will be apparent to those of ordinary skill in the art. The catalog metadata 156 may be usable for restore browsing, e.g., at a later time. For example, the data layout of stored information in backup storage devices 160a-160b and archive stores 162a-162b may be stored in the catalog 156.

In one embodiment, a file system 154 may be used to provide a special-purpose database for the storage, organization, manipulation, and retrieval of data. File system 154 may provide access to data by operating as clients for a network protocol. Alternatively, file system 154 may be virtual and exist only as an access method for virtual data. In one embodiment, the backup server 150 comprises a file system 154, but the storage servers 120a-120b do not.

It is noted that in alternative embodiments, the number and type of client computers and servers, switches, networks and shared storage is not limited to those shown in FIG. 1. At various times one or more clients may operate offline. In addition, during operation, individual client computer connection types may change as users connect, disconnect, and reconnect to network architecture 100.

Figure 2:
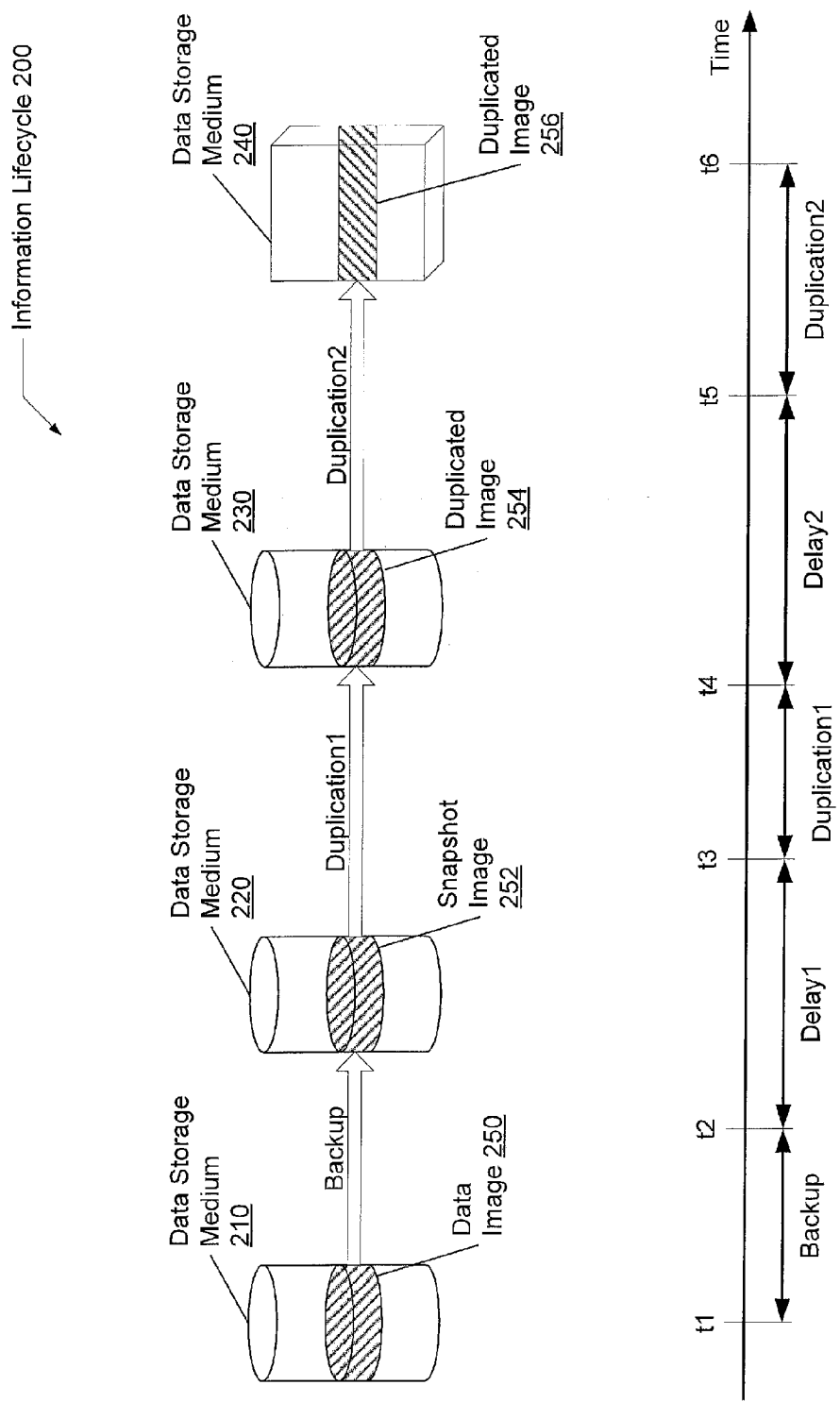
FIG. 2 is a generalized block diagram illustrating one embodiment of an information lifecycle.

Referring to FIG. 2, a generalized block diagram of one embodiment of an information lifecycle 200 is shown. Information lifecycle 200, or simply lifecycle 200, illustrates the managing of a flow of an information system's data and associated metadata from creation and initial storage to the time when the data becomes obsolete and may be deleted. A data image may comprise at least one or more files of information, associated metadata, and associated storage arrangement information such as directories, folders, and subfolders. Data image 250 may be stored on a data storage medium 210. In one embodiment, data image 250 is initially stored on data storage medium 210 at time t1. In another embodiment, time t1 may be chosen as an initial point-in-time for lifecycle 200 although data image 250 has been stored on data storage medium 210 for a period of time prior to time t1.

In one embodiment, data storage medium 210 may be a disk drive associated with a file system used for storing data of one or more client computers. A scheduled backup operation may create a copy of data image 250 to be stored on a separate storage medium, such as data storage medium 220. Snapshot image 252 may represent a copy of data image 250. The one or more files in snapshot image 252 may comprise a different file format than a format used to store data image 250. The backup operation may be a scheduled event by an information technology (IT) administrator. The backup operation that creates snapshot image 252 may be scheduled during a particular time window of availability, wherein a determination is made that no concurrent access of data storage medium 220 occurs during the particular time window of availability. For example, it may be determined another lifecycle policy, which is not shown, is not concurrently accessing data storage medium 220 when the backup operation is occurring. In one embodiment, data image 250 may be deleted, or expired, from data storage medium 210 after the snapshot image 252 is created. This deletion may occur immediately or a given time after the snapshot creation according to a schedule by the IT administrator.

The process described above may be repeated for subsequent moves of the data image 250. Continuing with the flow of data illustrated in lifecycle 200, a subsequent duplication operation, which is shown as Duplication1 in FIG. 2, may move the snapshot image 252 from data storage medium 220 to data storage medium 230. This subsequent duplication operation may occur after a given delay, which is shown as Delay1 in FIG. 2. A copy of the data stored in snapshot image 252 is made and represented in FIG. 2 by duplicated image 254. As used herein, the term "duplication" refers to a copy operation that occurs after an initial backup operation of a data image. The duplication operation is performed on a snapshot image or another subsequent copy of the snapshot image. The movement of data in snapshot image 252 to duplicated image 254 may be through two or more networks between two storage servers. For example, referring again to FIG. 1, the movement of data may occur from storage server 120a through the Internet 190 and another network 192 to storage server 120b.

The duplication operation that creates duplicated image 254 may be scheduled during a particular time window of availability. For example, the time window that occurs between time t3 and time t4 is a time window of availability for the first duplication operation. Similar to the deletion of data image 250, snapshot image 252 may be deleted, or expired, from data storage medium 220 after the duplicated image 254 is created. This deletion may occur immediately or a given time after the creation of the duplicated image 254.

The movement process described above may be repeated several more times as defined by system administration. For example, another duplication operation, which is shown as Duplication2 in FIG. 2, may move duplicated image 254 from data storage medium 230 to data storage medium 240. This subsequent duplication operation may occur a given delay after the completion of the previous duplication operation.

This given delay is shown as Delay2 in FIG. 2. Similar to the data transfer during Duplication1, he movement of data in snapshot image 252 to duplicated image 254 may be through two or more networks between two storage servers. In one embodiment, data storage medium 240 may be a final data storage medium in a lifecycle of data image 250 prior to sending data image 250 to an off-site storage location, an on-site tape storage medium, or otherwise.

Figure 3:
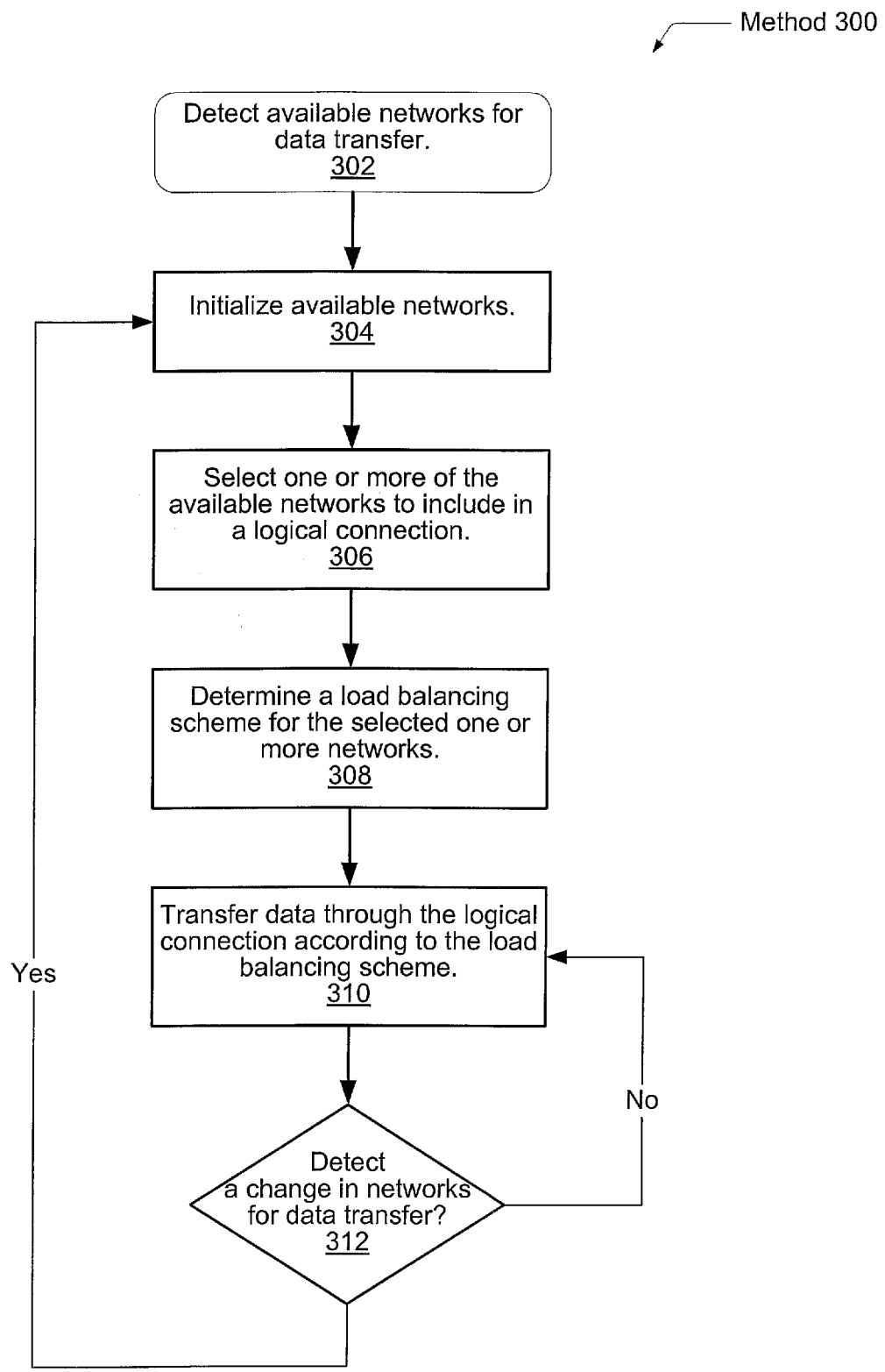
FIG. 3 is a generalized flow diagram illustrating one embodiment of a method for efficient transfer of backup data over multiple networks.

Turning now to FIG. 3, a generalized flow diagram illustrating one embodiment of a method 300 for efficient transfer of backup data over multiple networks is shown. The components embodied in network architecture 100 may generally operate in accordance with method 300. It is noted for purposes of discussion, the steps in this embodiment of method 300 are described in sequential order. However, some steps may occur in a different order than shown, some steps may be performed concurrently, some steps may be combined with other steps, and some steps may be absent in another embodiment.

In block 302, available networks for data transfer between two storage servers are detected. In one embodiment, a software layer is added to a backup software application. The software layer may be configured to discover various types of network resources on network interfaces of a corresponding storage server. In one example, the software layer discovers available Fibre Channel and Ethernet network resources from a Fibre Channel HBA port and an Ethernet network interface. In one example, the software layer may scan the Fibre Channel HBA ports to find available remote hosts and setup one initial logical communication channel between two hosts to transfer data. The two hosts may be storage servers 120a-120b in one example. Then the software layer may discover whether an Ethernet network is available for data transfer. If so, the Ethernet channel may be inserted into the single logical communication channel. Similarly, the Ethernet channel may initialize the single logical communication channel first.

In block 304, the discovered available networks are initialized. In one embodiment, an initialization protocol comprises a login phase that follows a discovery phase. Before packets may be transmitted between an initiator storage server and a target storage server, the steps for a given initialization protocol may be performed in order to establish links between the storage servers. In one embodiment, these links are virtual links. Examples of the initiator and the target storage servers include storage servers 120a-120b in FIG. 1. Initialization protocols are followed for network technologies such as Fibre Channel, Fibre Channel over Ethernet (FCoE), Infiniband and others. Network interface card (NIC) device drivers and logic within the software layer of the backup application 158 may be used to perform network initialization.

In block 306, one or more of the available initialized networks are selected to be included in a logical connection. The software layer described earlier may be within the backup application 158 or the code may be an add-on or a plug-in for the backup application 158. This software layer may bond two or more selected networks to a single logical channel for transferring data. For example, this software layer may bond together resources for an available Fibre Channel network and an available Ethernet network. In one embodiment, the software layer may utilize a set of application programming interfaces (APIs), such as socket APIs, to transfer data over a Fibre Channel network based on a SCSI target mode driver. Then the same APIs may be utilized to transfer data over both the available Fibre Channel and Ethernet networks.

In block 308, a load-balancing scheme for the selected networks is determined. A load-balancing scheme may be utilized to determine what portion of selected data to assign to each of the networks 190 and 192 for transferring data between storage server 120a and storage server 120b. As described earlier, a load balancing scheme may be based on packet size or data block size, available bandwidth of network ports, levels of idleness for networks within the single logical communication channel, connection of new networks, and disconnection of current network.

In block 310, an initiator storage server sends data to a target storage server through the single logical communication connection according to a load-balancing scheme. If a change in capabilities of networks for data transfer is detected (conditional block 312), then control flow of method 300 returns to block 304 and initialization is possibly performed again. Otherwise, control flow returns to block 310 and data is transferred according to the load-balancing scheme. A detected change may include disconnection of a current network, connection of a new network, or a change in utilization of a given network.

Figure 4:
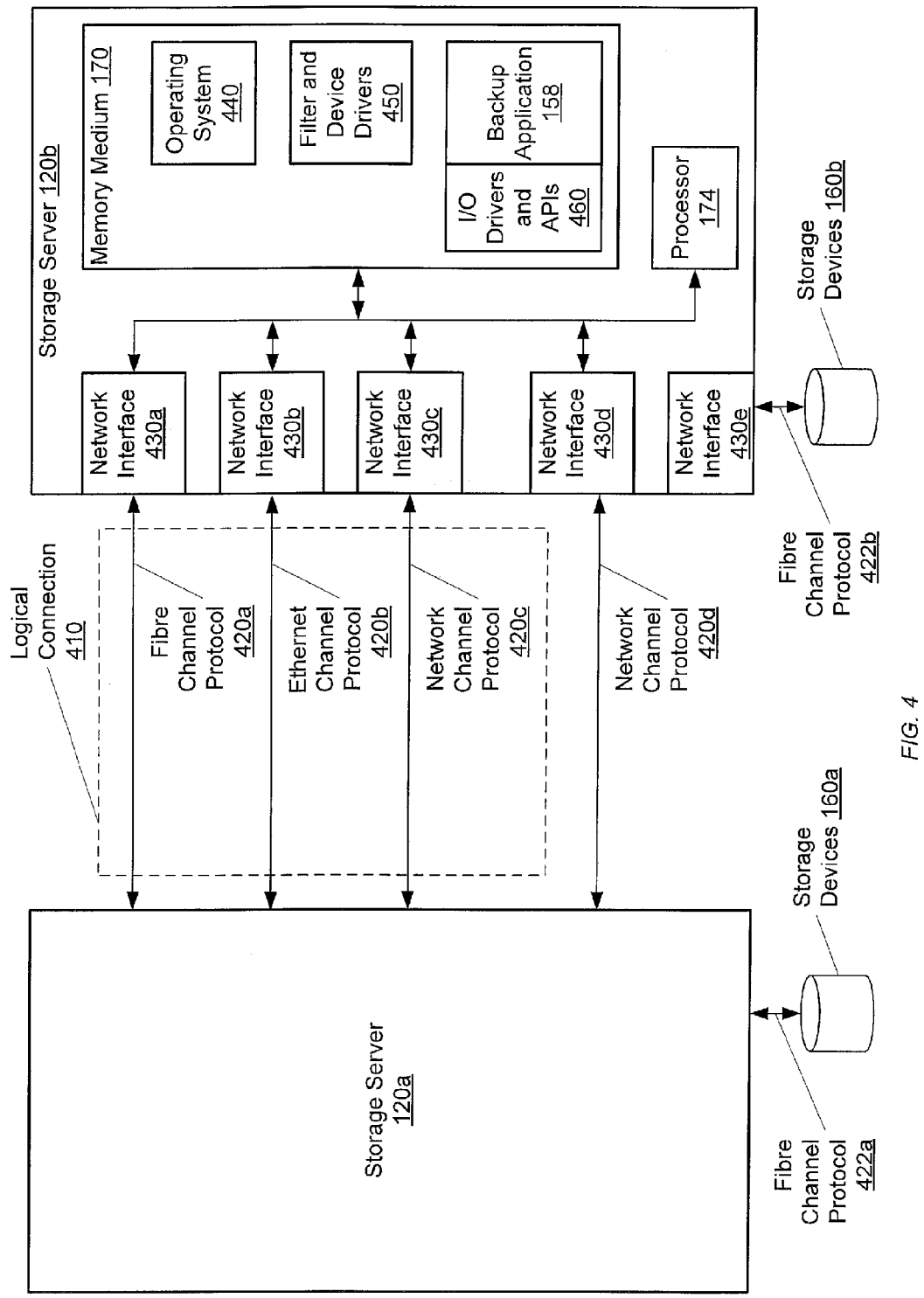
FIG. 4 is a generalized block diagram illustrating one embodiment of a single logical communication channel.

Turning now to FIG. 4, a generalized block diagram of one embodiment of a single logical communication channel is shown. Hardware and software components that correspond to those of FIG. 1 are numbered identically. Memory medium 170 comprises a base OS 440, one or more OS filter drivers and device drivers 450, and one or more other software applications, such as backup application 158. A software layer may include input/output (I/O) drivers and I/O APIs 460. It is noted that the depicted software components may be paged in and out of a main memory in a conventional manner from a storage medium such as a hard drive (not shown). Each of storage servers 120a-120b may be coupled to storage devices 160a-160b, respectively, through one of respective Fibre Channel connections 422a-422b.

A single logical communication channel 410 may comprise one or more available networks. For example, networks 420a-420c may have been selected to be included in the logical communication channel 410. As shown, at least a Fibre Channel protocol 420a, an Ethernet protocol 420b and another network protocol 420c (not specified) are within the logical communication channel 410. Networks corresponding to the protocols 420a-420c may be used for data transfer, such as for a duplication operation. The protocol 420d is not included in the logical communication channel 410.

The software in component 460, which may also include network proxy logic, may be used during network initialization and during packet handling procedures. This functionally may additionally include network protocol login steps, host identifier generation, packet conversion and packet tracking. This functionality may be implemented in hardware such as ASICs, in software, or both. A portion or all of this functionality may also be placed in a corresponding one of network interfaces 430a-430e. This functionality may include Berkeley sockets, or socket APIs. These socket APIs may allow network access, such as a connection-oriented approach, whereby TCP maintains a channel between the initiator storage server and the target storage server. This connection-oriented approach may also be referred to as a session-oriented approach. Socket APIs identify specific processes running on a machine that is accessible via an IP connection. By giving each service process running on a machine a "port"—a numeric value used to identify the process—a client application can distinguish between, say, a file transfer service and a Web service. Therefore, a message may be sent to a specific software process, which is an end point for the communication.

Figure 5:
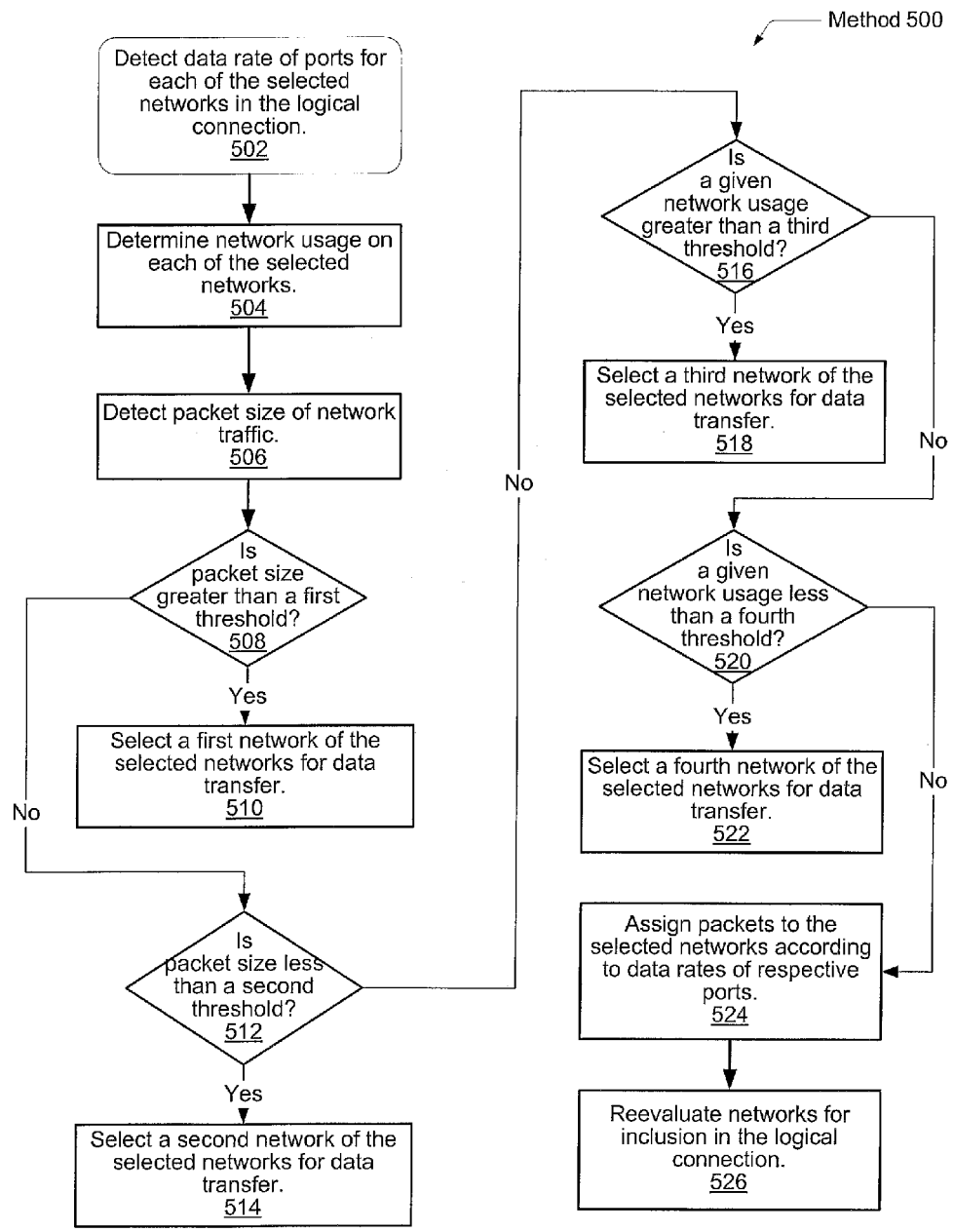
FIG. 5 is a generalized flow diagram illustrating one embodiment of a method for a load-balancing scheme used for data transfer through the single logical communication channel.

Turning now to FIG. 5, a generalized flow diagram illustrating one embodiment of a method 500 for a load-balancing scheme used for data transfer through the single logical communication channel is shown. The components embodied in network architecture 100 may generally operate in accordance with method 500. It is noted for purposes of discussion, the steps in this embodiment of method 200 are described in sequential order. However, some steps may occur in a different order than shown, some steps may be performed concurrently, some steps may be combined with other steps, and some steps may be absent in another embodiment.

In block 502, the data rate, or bandwidth, of network ports is scanned for each of the selected networks in the logical communication connection, or channel. In block 504, network usage of each of the selected networks is determined. In block 506, the packet size of network traffic is detected. At least all of this collected information may be used to determine a load-balancing scheme for data transfer across the single logical communication connection.

If the packet size of network traffic is greater than a given threshold (conditional block 508), then in block 510, a first network of the selected networks within the logical communication connection may be chosen for data transfer. For example, a given threshold may be 64 KB and for a packet with a size greater this threshold, a Fibre Channel network within the logical communication connection may be chosen for data transfer. Similarly, if the packet size of network traffic is less than another given threshold (conditional block 512), then in block 514, a second network of the selected networks within the logical communication connection may be chosen for data transfer. In addition, distance may be factored in to the decision-making process along with packet size.

If a given network usage is greater than a third threshold (conditional block 516), then in block 518, a third network of the selected networks may be selected for data transfer. For example, if one of the selected networks within the logical communication connection is heavily loaded already with network traffic, then another network may be selected for data transfer. A network that is relatively idle may be selected for data transfer. If a given network usage is less than a fourth threshold (conditional block 520), then in block 522, a fourth network of the selected networks may be selected for data transfer. For example, other networks may not be heavily loaded already with network traffic, but a given network may be idle or near idle. Therefore, this network may be chosen for data transfer. It is noted that weights may be assigned to each of the factors for load balancing and comparisons to given thresholds may be a first phase of determine a network to select for transferring current data packets.

In block 524, a data packet may be assigned to a given network of the networks within the logical communication connection according to data rates of respective network ports. Again, weights and other formulas may be utilized to derive a load-balancing scheme for determining data packet assignment. In block 526, a reevaluation of networks for inclusion in the logical communication connection may be performed.

Figure 6:
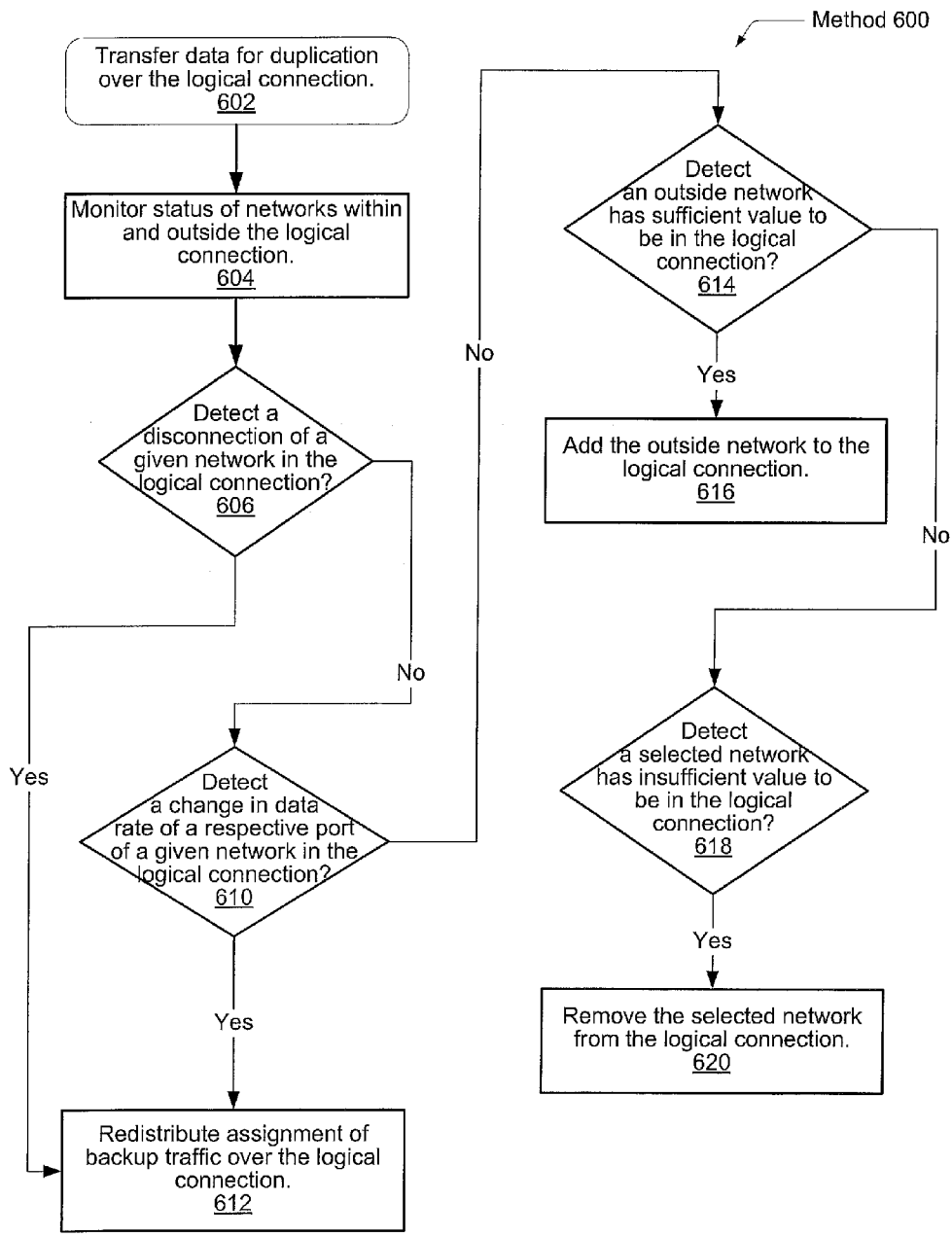
FIG. 6 is a generalized flow diagram illustrating one embodiment of a method for assigning network channels for the single logical communication channel.

Turning now to FIG. 6, a generalized flow diagram illustrating one embodiment of a method 600 for assigning network channels for the single logical communication channel is shown. The components embodied in network architecture 100 may generally operate in accordance with method 600. It is noted for purposes of discussion, the steps in this embodiment of method 200 are described in sequential order. However, some steps may occur in a different order than shown, some steps may be performed concurrently, some steps may be combined with other steps, and some steps may be absent in another embodiment.

In block 602, data is transferred for duplication over the logical communication connection. In block 604, statuses of networks within and outside the logical communication connection are monitored. If a disconnection of a given network within the logical communication connection is detected (conditional block 606), then in block 612, the assignment of backup data network traffic over the logical communication connection is performed again. A redistribution of the network traffic may occur now that at least one network channel is removed. The redistribution may follow steps shown in method 500. Available bandwidth of network ports, current usage of networks, and packet size may be used for determining the redistribution.

If a change in a data rate or an available bandwidth of a respective port of a given network within the logical communication connection is detected (conditional block 610), then control flow of method 600 moves to block 612. If a network channel outside the logical communication connection is detected to have sufficient value to be in the logical communication connection (conditional block 614), then in block 616, this network channel may be added to the logical communication connection. This outside network channel may have had more bandwidth added to its ports, may have reached a high level of idleness, may have good capabilities for efficiently transferring packets of a current size that are being transferred, or other.

Similarly, if a network channel inside the logical communication connection is detected to have insufficient value to be in the logical communication connection (conditional block 618), then in block 620, this network channel may be removed from the logical communication connection. The above factors may be used for this determination as well. Weights may be attributed to the differing factors and different formulas may be used to determine whether a given network channel has sufficient or insufficient value regarding being included in the logical communication channel. When a network channel is added or removed, the steps in method 500 may be repeated.

It is noted that the above-described embodiments may comprise software. In such an embodiment, program instructions and/or a database (both of which may be referred to as "instructions") that represents the described systems and/or methods may be conveyed or stored on a computer readable medium. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link.

In various embodiments, one or more portions of the methods and mechanisms described herein may form part of a cloud computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer implemented method comprising:
    detecting, by a first backup server, a plurality of networks coupling the first backup server to a second backup server, wherein the first backup server is configured to store a plurality of backup data images on a first storage device, wherein each of the backup data images includes data from a plurality of files, wherein the plurality of networks includes a first network of a first type and a second network of a different type;
    selecting, by the first backup server, two or more networks from the plurality of networks to include in a logical connection, wherein the logical connection is used for transferring backup data images stored on the first storage device, wherein the selected two or more networks include the first network and the second network;
    in response to determining that the selected two or more networks are included in the logical connection, determining, by the first backup server, a load balancing scheme for the selected two or more networks;
    reading, by the first backup server, a first backup data image from the first storage device; and
    transferring, by the first backup server, the first backup data image to the second backup server through the logical connection according to the load balancing scheme, wherein said transferring comprises transferring a first portion of the first backup data image over the first network of the first type and transferring a second portion of the first backup data image over the second network of the different type.

2. The method as recited in claim 1, further comprising selecting networks to include in the logical connection for transferring backup data images based upon at least one of the following: detecting network availability and determining available bandwidth of a detected network is above a given threshold.

3. The method as recited in claim 2, further comprising transferring the first backup data image via the logical connection after initialization of networks without accompanying control messages.

4. The method as recited in claim 1, further comprising assigning packets having a size greater than a threshold size to a given network, wherein said transferring the first backup data image includes transferring a plurality of packets, wherein at least a subset of the packets have a size greater than the threshold size, wherein the given network is selected to transfer each packet having a size greater than the threshold size.

5. The method as recited in claim 1, further comprising assigning a given percentage of the logical connection to a given selected network based upon available bandwidth of a network port corresponding to the given selected network.

6. The method as recited in claim 1, further comprising assigning a given percentage of the logical connection to a given selected network based upon detecting at least one of the following: connection of new networks, disconnection of current networks, and a level of idleness of one or more selected networks reaches a given threshold.

7. The method as recited in claim 1, wherein the transfer of the first backup data image through the logical connection comprises a duplication operation to duplicate the first backup data image from the first backup server to the second backup server.

8. The method as recited in claim 1, wherein the transfer of the first backup data image through the logical connection utilizes socket application programming interfaces (APIs).

9. The method as recited in claim 1, wherein the first backup server is coupled to the first network through a first type of network interface device, and wherein the first backup server is coupled to the second network through a different type of network interface device.

10. The method as recited in claim 9, wherein the first type of network interface device is a Fibre Channel network interface device, and wherein the different type of network interface device is an Ethernet network interface device.

11. The method as recited in claim 1, wherein the first network is a Fibre Channel network, and wherein the second network is an Internet Protocol (IP)-based network.

12. A first backup server comprising:
    one or more processors; and
    memory storing program instructions, wherein the program instructions are executable by the one or more processors to cause the first backup server to:
        store a plurality of backup data images on a first storage device, wherein each of the backup data images includes data from a plurality of files;
        detect a plurality of networks coupling the first backup server to a second backup server, wherein the plurality of networks includes a first network of a first type and a second network of a different type;
        select two or more networks from the plurality of networks to include in a logical connection, wherein the logical connection is used for transferring backup data images stored on the first storage device, wherein the selected two or more networks include the first network and the second network;
        in response to determining that the selected two or more networks are included in the logical connection, determine a load balancing scheme for the selected two or more networks;
        read a first backup data image from the first storage device; and
        transfer the first backup data image to the second backup server through the logical connection according to the load balancing scheme, wherein said transferring comprises transferring a first portion of the first backup data image over the first network of the first type and transferring a second portion of the first backup data image over the second network of the different type.

13. The first backup server of claim 12, wherein the program instructions are further executable by the one or more processors to cause the first backup server to select networks to include in the logical connection for transferring backup data images based upon at least one of the following: detecting network availability and determining available bandwidth of a detected network is above a given threshold.

14. The first backup server of claim 12, wherein the program instructions are further executable by the one or more processors to cause the first backup server to:
assign packets having a size greater than a threshold size to a given network, wherein said transferring the first backup data image includes transferring a plurality of packets, wherein at least a subset of the packets have a size greater than the threshold size, wherein the program instructions are executable by the one or more processors to cause the first backup server to transfer each packet having a size greater than the threshold size over the given network.

15. The first backup server of claim 12, wherein the program instructions are further executable by the one or more processors to cause the first backup server to assign a given percentage of the logical connection to a given selected network based upon available bandwidth of a network port corresponding to the given selected network.

16. The computing system of claim 12, wherein the transfer of the first backup data image through the logical connection utilizes socket application programming interfaces (APIs).

17. A non-transitory computer-readable storage medium storing program instructions, wherein the program instructions are executable by one or more processors of a first backup server to cause the first backup server to:
store a plurality of backup data images on a first storage device, wherein each of the backup data images includes data from a plurality of files;
detect a plurality of networks coupling the first backup server to a second backup server, wherein the plurality of networks includes a first network of a first type and a second network of a different type;
select two or more networks from the plurality of networks to include in a logical connection, wherein the logical connection is used for transferring backup data images stored on the first storage device, wherein the selected two or more networks include the first network and the second network;
in response to determining that the selected two or more networks are included in the logical connection, determine a load balancing scheme for the selected two or more networks;
read a first backup data image from the first storage device; and
transfer the first backup data image to the second backup server through the logical connection according to the load balancing scheme, wherein said transferring comprises transferring a first portion of the first backup data image over the first network of the first type and transferring a second portion of the first backup data image over the second network of the different type.

18. The non-transitory computer-readable storage medium of claim 17, wherein the program instructions are further executable by the one or more processors to cause the first backup server to select networks to include in the logical connection for transferring backup data images based upon at least one of the following: detecting network availability and determining available bandwidth of a detected network is above a given threshold.

19. The non-transitory computer-readable storage medium of claim 17, wherein the program instructions are further executable by the one or more processors to cause the first backup server to:
assign packets having a size greater than a threshold size to a given network, wherein said transferring the first backup data image includes transferring a plurality of packets, wherein at least a subset of the packets have a size greater than the threshold size, wherein the program instructions are executable by the one or more processors to cause the first backup server to transfer each packet having a size greater than the threshold size over the given network.

20. The non-transitory computer-readable storage medium of claim 19, wherein the program instructions are further executable by the one or more processors to cause the first backup server to assign a given percentage of the logical connection to a given selected network based upon available bandwidth of a network port corresponding to the given selected network.

* * * * *